United States Patent

Koop, Jr. et al.

[15] 3,641,779
[45] Feb. 15, 1972

[54] STINGER SYSTEM FOR GUIDING A PIPELINE FROM OR ON A MOVING VESSEL

[72] Inventors: Francis Detrich Koop, Jr.; Paul Kingston Johnson; Larry Rayner Russell, all of Houston, Tex.

[73] Assignee: Fluor Corporation, Los Angeles, Calif.

[22] Filed: Mar. 24, 1970

[21] Appl. No.: 22,221

[52] U.S. Cl. ........................................................61/72.3
[51] Int. Cl. .................................B63b 35/04, F16l 1/00
[58] Field of Search ..............61/72.1, 72.3, 72.5; 193/35 R, 193/35 S, 35 C; 214/1 PL

[56] References Cited

UNITED STATES PATENTS

| | | | |
|---|---|---|---|
| 1,239,879 | 9/1917 | Carlson | 193/35 |
| 3,390,532 | 7/1968 | Lawrence | 61/72.3 |
| 3,438,213 | 4/1969 | Broussard et al. | 61/72.3 |
| 3,507,126 | 4/1970 | Rochelle et al. | 61/72.3 |
| 3,517,519 | 6/1970 | Kolb et al. | 61/72.3 |

*Primary Examiner*—David J. Williamowsky
*Assistant Examiner*—David H. Corbin
*Attorney*—Michael P. Breston

[57] ABSTRACT

The improved stinger system includes a pivotal, compression hitch, a stinger coupling, and one or more stinger sections. The hitch pivotally connects the front end of the coupling to the rear end of the vessel and establishes below the pivotal connection a compression joint between the coupling and the vessel. Pivot means carried on the rear end of the stinger coupling pivotally connect the uppermost stinger section for pivotal motion about a generally horizontal axis extending through the stinger coupling. The pivot means can be selectively and vertically adjustable along the rear end of the coupling to change the pipe's radius of curvature dependent on the desired exit angle of the pipe from the stinger system into the body of water. At least the stinger coupling carries horizontal, pipe-engaging support rollers and lateral, pipe-restraining rollers. The horizontal support rollers can be selectively and vertically adjustable to provide for predetermined radii of curvature for the moving pipeline.

3 Claims, 10 Drawing Figures

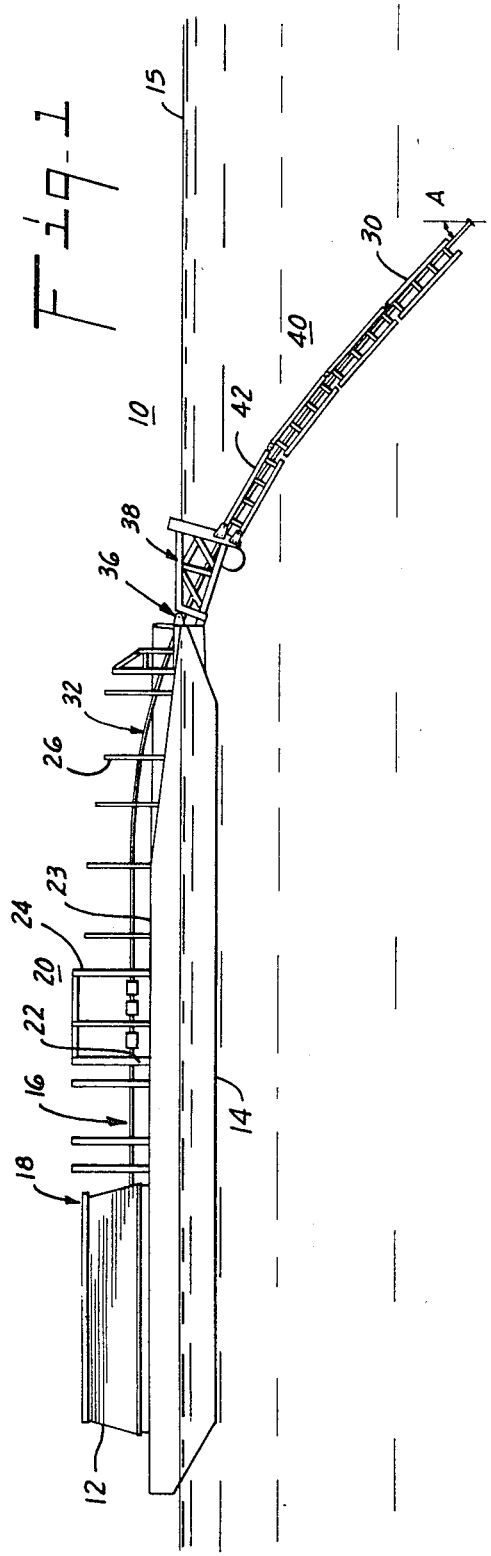
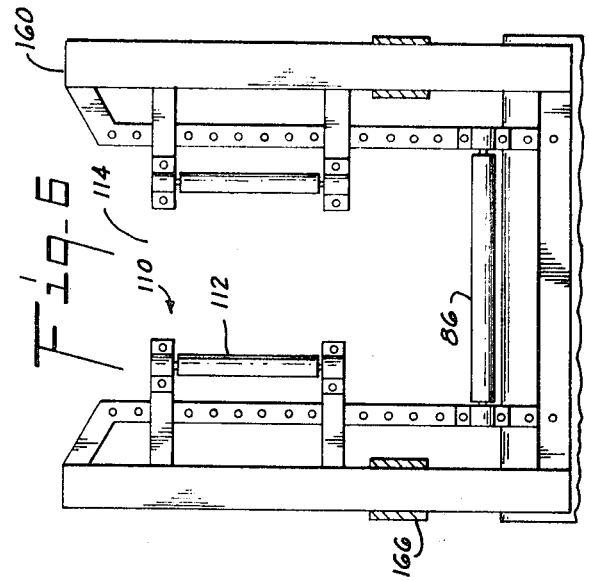
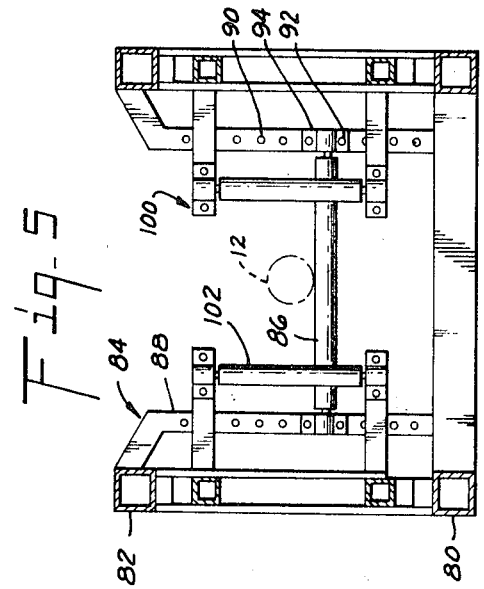
FRANCIS D. KOOP, JR.
PAUL K. JOHNSON
LARRY R. RUSSELL
BY                INVENTORS.
Michael P. Breston
ATTORNEY

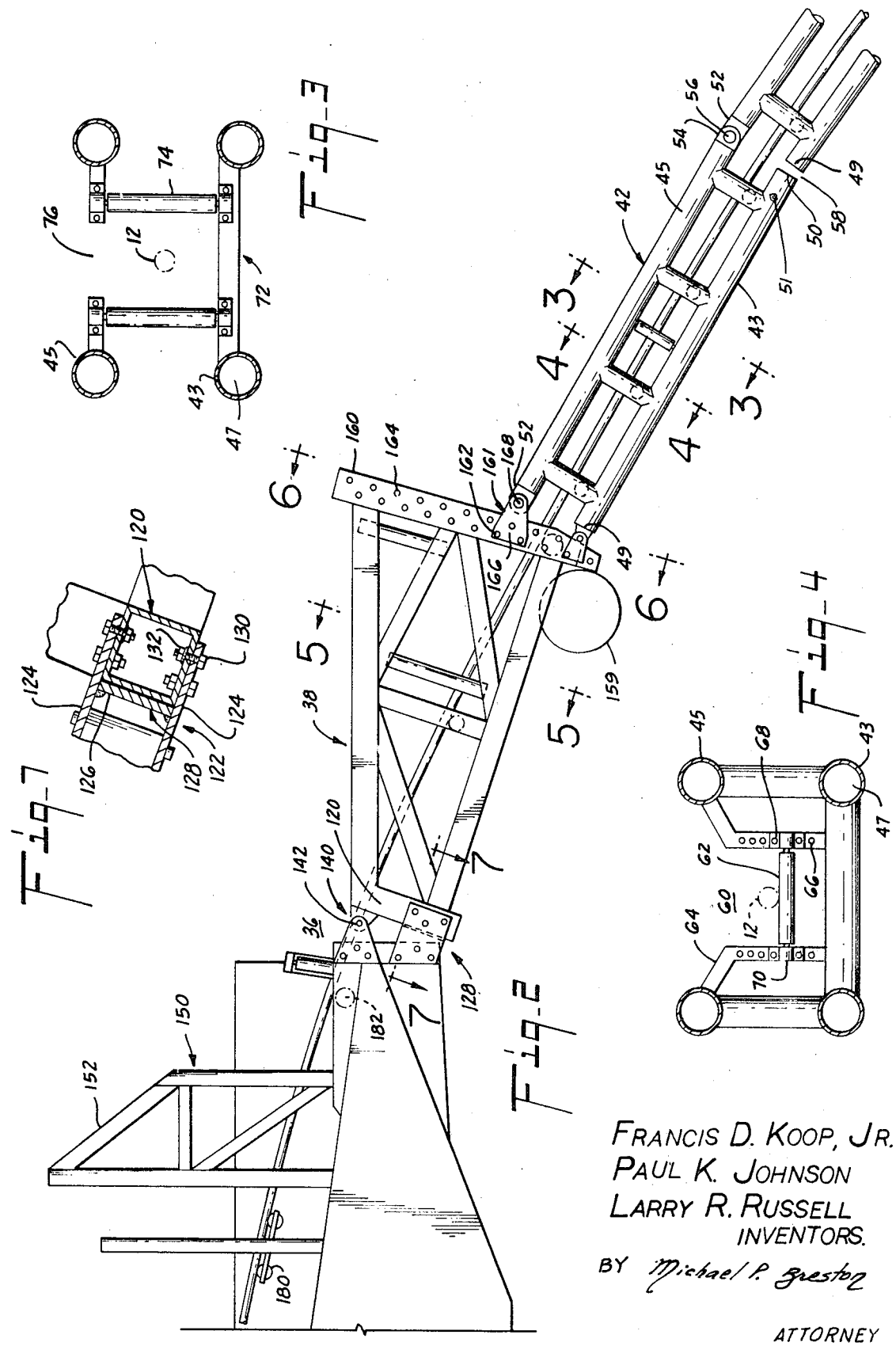

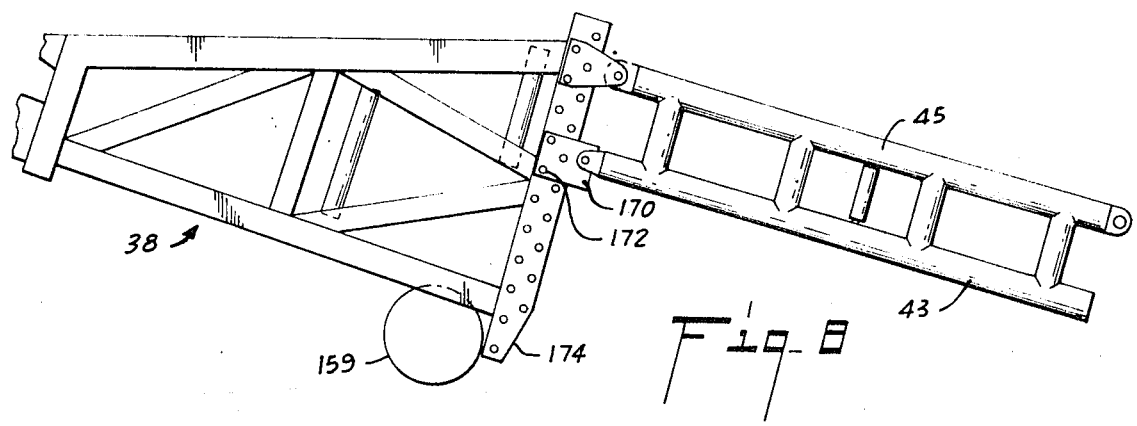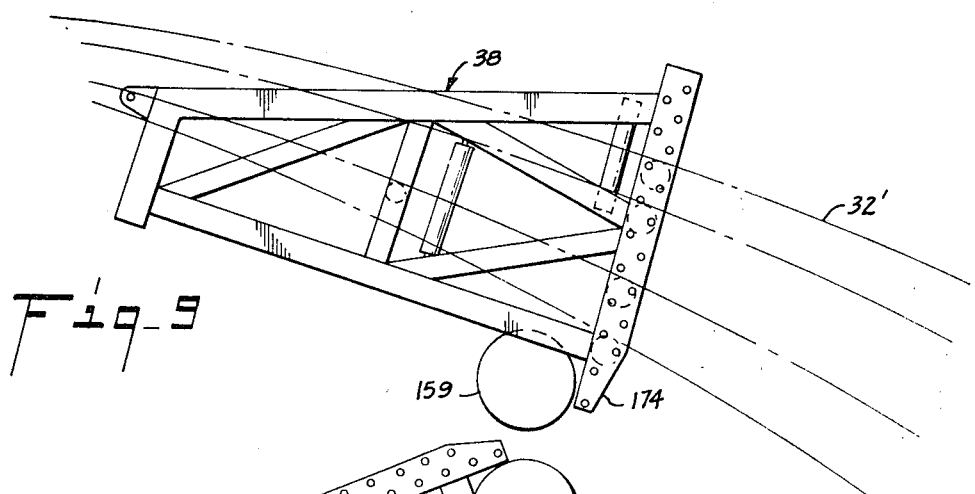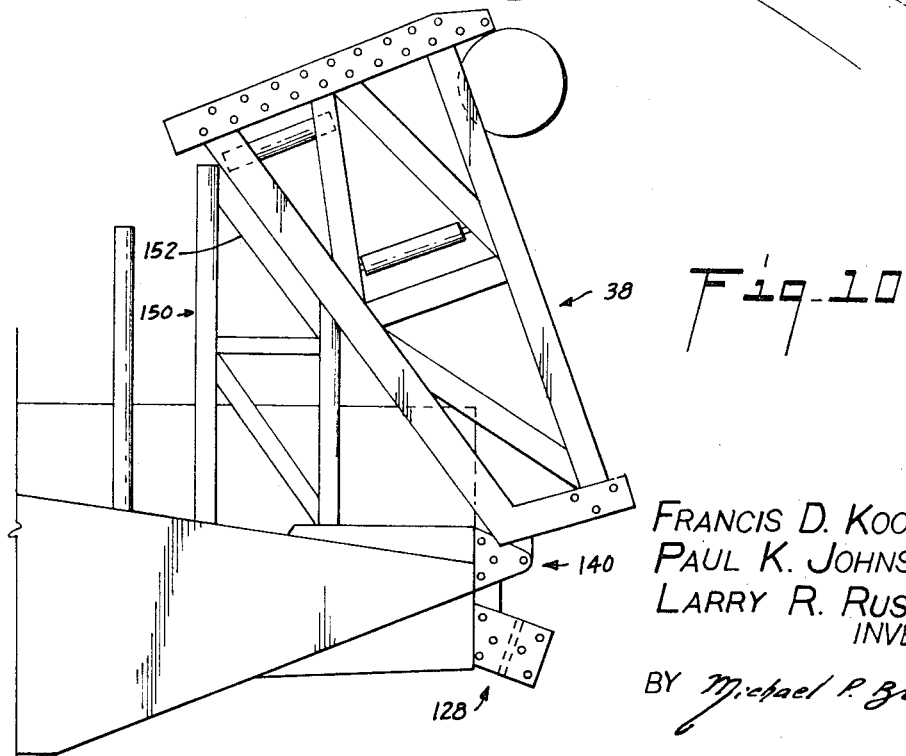

STINGER SYSTEM FOR GUIDING A PIPELINE FROM OR ON A MOVING VESSEL

BACKGROUND OF THE INVENTION

1. Field of the Invention

This invention generally relates to the field of laying pipelines from a moving vessel onto the floor of a body of water by controllably guiding the pipeline over an arcuate stinger assembly.

2. Description of the Prior Art

Guiding a pipeline from a moving vessel to a marine bottom is ordinarily accomplished with guide structures called stingers. Without the use of a stinger, the radius of curvature of the pipeline might fall below a minimum, tolerable radius and the bending moments then exerted on the pipeline could produce permanent deformations or ovalation of the pipe's cross section. It is therefore the main object of a stinger to controllably maintain the radii of curvature of the pipe's trajectory within an allowable range.

Early stingers were substantially straight and descended to an elevation very near the water bottom. As pipe-laying operations extend into deeper and deeper offshore waters, the use of straight stingers becomes rather impractical. Curved stingers have therefore been proposed which provide a definite advantage over straight stingers. The main advantage of curved stingers is that their overall length can be much shorter than the length of a corresponding straight stinger for the same diameter pipe and water depth. A curved stinger allows the length of the unsupported portion of the pipeline in the water to increase in accordance with well-established, theoretical considerations.

One such proposed arcuate stinger is comprised of pivotally joined sections. Interposed between the sections are extensible members which can be extended or shortened by remote control from the deck of the vessel, thereby varying the radius of curvature of the pipe's trajectory. These extensible members are all driven simultaneously to either reduce or increase this radius of curvature.

Such arcuate and articulated stingers are relatively complex and expensive to manufacture. In operation, they are subject to frequent malfunction, especially under adverse conditions. The uncoupling of one or more stinger sections, or of the top stinger section from the hitch which connects the top section to the vessel is a relatively time-consuming job. Therefore, when it is necessary or desirable to remove the stinger from its submerged position for repair or storage, increased operating costs and reduced speed of pipe laying are encountered.

Other problems may occur in using the above-described arcuate and articulated stinger: Even though the stinger is articulated, after the extensible members are adjusted, the entire stinger assembly becomes essentially rigid. Since the pipe-laying vessel undergoes various pitching, rolling and yawing motions, the rigid stinger assembly becomes subjected to external forces, which under excessive, adverse operating conditions, may fatigue one or more structural frames within the stinger assembly.

SUMMARY OF THE INVENTION

Accordingly, it is a main object of this invention to provide an improved stinger system intended to obviate the above-described, and other problems associated with known type stingers.

Other objects of the invention are concerned with providing an improved stinger system for controllably adjusting the radii of curvature of the pipe's trajectory as it moves from or on the deck of a pipe-laying vessel. The stinger system is adapted to provide: ease of curvature adjustment, dependable support points for the pipe on the stinger coupling, relatively low cost of manufacture, minimum of maintenance, ease of assembly and disassembly, and ease of storage on deck.

It is yet another object of this invention to provide an improved stinger assembly wherein one or more sections of the stinger may be pivotally interconnected, and are free to pivot relative to each other within allowed limits, thereby protecting the structural support members of the stinger assembly from becoming subjected to excessive external loads.

The improved stinger assembly according to a preferred embodiment of this invention utilizes a pivotal, compression hitch for connecting the stinger coupling to the vessel. The stinger coupling is rigid, longitudinally extending truss structure. The uppermost stinger section is pivotally connected to the rear end of the stinger coupling by pivot means which can be selectively and vertically adjustable.

Additionally, the stinger coupling rotatably carries horizontal pipe-engaging, support rollers and lateral, pipe-restraining rollers. The horizontal rollers are selectively and vertically adjustable to accommodate different radii of curvature which may be needed when laying pipelines.

In one apparatus aspect of the invention, said hitch establishes a tension-compression joint (bolted or pinned) below its pivotal connection between the stinger coupling and the vessel, so that only the horizontal, pipe-engaging support rollers need be vertically moved to obtain different radii of curvature for the pipe's trajectory. In another aspect, the compression joint is releasably secured to the rear end of the vessel.

BRIEF DESCRIPTION OF THE DRAWINGS

An apparatus according to certain preferred embodiments of the invention is illustrated in the accompanying drawings in which:

FIG. 1 is a view in elevation of a pipe-laying vessel connected to the stinger system of this invention;

FIG. 2 is an enlarged showing of a portion of the stinger system in FIG. 1;

FIGS. 3, 4, 5, 6, and 7 are sections on FIG. 2 along lines 3—3, 4—4, 5—5, 6—6, and 7—7, respectively;

FIG. 8 is a view in elevation of the top stinger section in its uppermost vertical position relative to the stinger coupling;

FIG. 9 is a representation of the stinger coupling showing the vertically displaced pipe's trajectories; and FIG. 10 is a view in elevation of the folded stinger coupling resting on a support on the vessel.

Referring now to the drawings, there is shown a stinger system, generally designated 10, for guiding a long pipeline 12 from or on a pipe-laying barge or vessel 14 movable forwardly in a longitudinal direction in a body of water 15.

Pipe 12 is typically made of steel material of a suitable pipe grade. Its outer diameter varies between, say 4 inches to 12 inches, and even higher. For example, a standard X-grade, 12 inches line pipe, Schedule 20 to 80, API 5L, Grade B, seamless can be layed with the stinger system 10 of the present invention.

Pipe 12 is typically covered with a protective outer coating. A reel 18, mounted for rotation about a vertical axis and carrying a spool of the pipe 12, unwinds a span 16 of the pipeline 12. The emerging pipe scan 16 from reel 18 is curvilinear. It is subsequently straightened by a straightener-and-tensioner system 20, mounted on a platform 22 for vertical reciprocation on a plurality of vertically extending posts 24. The reciprocation is synchronized with the rate of unwinding of the pipe span 16. Span 16 is adjustably vertically supported for movement along a desired trajectory in a vertical plane. Such a support is provided by stanchions 26, five of which are shown in FIG. 1.

The manner of dispensing pipe span 16 from the stern of vessel 14 forms no part of this invention, and accordingly, no further description is believed necessary.

It is the general object of the stinger system 10, forming part of this invention, to controllably guide the pipe span 16 from the stern of vessel 14 into the body of water 15. After pipe span 16 leaves the stinger system 10, it becomes suspended in the body of water 15 between the bottom stinger section 30 and the sea floor (not shown). The parameters of usual interest include: the amount of horizontal force required to impart to the pipe span 16 as it exits from section 30, the angle of inclination A which the exiting pipe forms with the vertical, the depth of the body of water from section 30 to the bottom, and other known parameters.

To maintain pipe span 16 under tension while it is being movably guided on the stinger system 10, a tensioner is typically provided on the platform 22 or the deck 23 of vessel 14. The tensioner may be eliminated and one end of the pipe secured to the sea bed while the other is pulled by the vessel along the lay line. The manner of placing pipe span 16 under tension is well known in the art.

The arcuate trajectory 32 of the pipe span 16 as it moves through the stinger system 10 may have one or more radii of curvature. The minimum radius of curvature can be selected to prevent buckling of the pipe, that is, ovalling of the pipe's cross section or to minimize permanent deformation of the pipe.

The foregoing generally discussed portion of the pipe-laying apparatus is described in more detail hereinafter.

The previously mentioned stinger system 10 includes in combination a pivotal, compression-joint hitch 36, a stinger coupling 38 and an assembly of stinger sections generally designated 40, whose bottom section is 30 and top section is 42. To simplify the drawings, similar parts are designated with the same reference characters throughout the drawings.

Each section 40 is a trusslike, U-shaped structure (FIGS. 3 and 4) including two laterally spaced, longitudinally extending bottom chords 43 and two laterally spaced, longitudinally extending top chords 45 positioned above chords 43. Chords 43 and 45 are interconnected by intermediate cross-bracings aligned transversely to chords 43. Each chord 43 can be made of a tubular member so as to define a fluidtight chamber 47 between its end walls 49 and 50. A fluid inlet and outlet, generally designated 51, in at least each bottom chord 43 allows either compressed air or water to become admitted or removed to thereby vary selectively the buoyancy of one or more of the stinger sections 40.

The left end (FIG. 2) of each upper chord 45 is flattened into a pivot ear 52 and the right end is flattened into a pivot ear 54. Adjacent and opposite ears 52 and 54 are pivotally interconnected by a pivot 56. The buoyancy of sections 40 is adjusted to normally maintain in operation a limited arcuate spacing 58 between adjacent bottom chords 43, thereby allowing limited freedom of pivotal rotation between adjacent stinger sections 40 about a generally horizontal axis extending through the two laterally displaced pivots 56 interconnecting the laterally displaced top chords 45 of each section 40. The pivotal rotation is limited by the end walls 49 and 50 of adjacent and opposite bottom chords 43. In this manner, fatigue stresses which can become generated within the structural frame members are greatly minimized.

In order to provide horizontal support for the pipe span 16 along a gently curved descent trajectory, a plurality of pipe supporting roller frames 60 rotatably support horizontal rollers 62 which can be selectively and vertically adjusted along laterally spaced vertical support guides 64 having holes 66 therein for releasably securing, as by bolts 68, a locking mechanism 70.

To protect the outer jacket of pipe 12 as well as the side frames from becoming damaged, and to limit the lateral displacement of the pipe, one or more (generally one) roller frame 72 (FIG. 3) are provided for rotatably supporting a pair of laterally displaced, vertical rollers 74. The transverse roller frame 72 provides a passage 76 through which pipe 12 can move in and out of each section 40.

The stinger coupling 38 is a trusslike, U-shaped structure (FIGS. 2, 5, 6, and 7) including two laterally spaced, longitudinally extending bottom chords 80 and two laterally spaced, longitudinally extending top chords 82 above chords 80. Chords 80 and 82 are interconnected by intermediate, cross bracings aligned transversely to chords 80. In order to provide horizontal support for the pipe span 16 along a gently curved descent trajectory, a number (generally two) of pipe-supporting roller frames 84 are provided for rotatably supporting horizontal rollers 86 which can be selectively and vertically adjusted along laterally spaced, vertical support guides 88 having holes 90 therein for releasably securing, as by bolts 92, a locking mechanism 94.

To protect the outer jacket of pipe 12, as well as the side frames from becoming damaged, and to limit the lateral displacement of pipe 12, a roller frame 100 (FIG. 5) is provided for rotatably supporting a pair of laterally displaced, vertical rollers 102. The length of rollers 102 is sufficient for relatively low radii of curvature assumed by the pipe trajectory 32. For greater radii of curvature, another roller frame 110 is provided for rotatably supporting a pair of laterally displaced, vertical rollers 112 (FIG. 6). Roller frames 100 and 110 will allow the pipe to enter in and out of the stinger coupling 38 through a passage 114.

The two front side bracings 120 (FIGS. 2 and 7) form with the rear end of the pipe laying vessel 14 the previously mentioned pivotal compression-joint hitch 36. Extending from the vessel 14 are two laterally displaced pairs of U-shaped brackets 122 having longitudinally and downwardly extending sideplates 124 and a heavyweight, thick cross plate 126 which is fixedly secured to plates 124. The lower end of each side bracing 120 forms a compression joint, generally designated 128, for the abutting engagement between the side bracing 120 and plate 126. If desired the compression joint can be releasably secured by bolts 130 which are threaded into internally secured nuts 132.

The upper end of each side bracing 120 is pivotally mounted on pivots 142 in a pivot means, generally designated 140, of conventional design. Accordingly, stinger coupling 38, when bolts 130 are removed, can be made to rotate about a horizontal axis extending through the pivots 142. A suitable support 150 having an inclined platform 152 is mounted on the stern of vessel 14 and is adapted to support the stinger coupling 38 when in transit, as sown in FIG. 10. To relieve the stresses which may be imposed on the structural members of the stinger coupling 38, there can be provided a buoyant chamber 159 under the coupling 38.

In operation, when the vessel is at the marine location on the lay line, the stinger coupling 38 is pivoted clockwise about its pivots 142 from its storage position to its operating position. Since the weight of the pipe and of the stinger sections 40 is normally sufficient to maintain an abutting engagement at the compression joint 128, bolts 130 need not be used. Should however adverse operating conditions be expected, coupled with the possibility that the stinger coupling 38 will be lifted, then bolts 130 will be threaded into corresponding nuts 132.

To each rear side bracing 160 of coupling 38 is releasably secured, as by bolts 162 extending transversely through holes 164, a pivot means 161 having a pair of lugs 166. Each pair of lugs 166 pivotally accepts an ear 52 of a top chord 45 in stinger section 42 to allow stinger section 42 to pivot about a transverse, horizontal axis extending through the two laterally displaced, horizontal pivots 168. Lugs 166 can be releasably vertically adjusted from a lowermost position, as shown in FIG. 1, to an uppermost position, as shown in FIG. 8. To limit the downward rotation of section 42, there can be mounted underneath pivot means 161 a tension-compression joint 170 which is releasably secured to the side bracings 160 by bolts 172. When pin 172 is removed it is a compression joint and with pin 172 it is a tension joint.

SUMMARY AND ADVANTAGES

The apparatus of the present invention provides considerable advantages in carrying out underwater pipe-laying operations.

Particular advantages are provided by the vertically adjustable pivot means 161 which permits the radius of curvature of stinger sections 40 to be manually and readily varied in a relatively simple fashion. As the pivot means 161 is vertically raised, the radius of curvature of the descending pipe span 32 will increase, and the various positions of the pipe span 32 through the stinger coupling 38 are shown by the lines 32' in FIG. 9. For each position of the pivot means 161, the horizontal pipe-engaging support rollers 86 will be vertically adjusted to provide fixed support points under the curved pipe. These fixed points permit the programming of the movements of the support rollers, such as 180, on the stanchions 26, as well as the positioning of the exit roller 182 at the stern of vessel 14.

Another important advantage of the present invention lies in the provision of the compression joint 128 which secures the vertical positions of the horizontal rollers 86. Any desired change in the vertical position of a roller 86 can be easily accomplished by moving it up or down on the vertical support guides 88, without the necessity of rotating or pivoting the entire stinger coupling 38, nor of extending or contracting extensible members.

Other significant advantages of the present invention are provided by the vertically adjustable pivot means 161 between the top section 42 and the stinger coupling 38, as well as by the pivotal connections 56 between the remaining stinger sections 40.

Although the invention has been described with reference to certain preferred embodiments, it will be apparent to those skilled in the art that additions, modifications, substitutions, and deletions not specifically described herein may be made which will fall within the scope of the appended claims.

What is claimed is:

1. A stinger assembly for guiding a pipeline between a floating platform and a body of water, said assembly including:
   a stinger coupling adapted to bend said pipeline to a generally constant, desired curvilinear configuration as said pipeline moves between said platform and said body of water;
   coupling means on the rear end of said platform and on the front end of said stinger coupling adapted to rotatably mount and releasably engage said stinger coupling to said rear end of said platform and to prevent relative rotation between said stinger coupling and said platform;
   at least one pipeline support means mounted on said stinger coupling
   said pipeline support means being selectively, vertically adjustable to controllably vary the desired radius of curvature of the guided pipeline configuration;
   said coupling means including:
      a tension-compression joint means between said platform and said stinger coupling,
      pivot means adapted to pivotally couple said stinger coupling to said platform,
      said joint means being positioned below said pivot means, and
      said joint means together with said pivot means providing a rigid coupling and preventing relative rotation between said stinger coupling and said platform.

2. The stinger assembly of claim 1 wherein,
said joint means is adapted to be releasably secured, and
said stinger coupling is rotatable about a generally horizontal pivot axis to become stored on the stern of said floating platform.

3. The stinger assembly of claim 1 and further including:
a floating member positioned below and coupled to said stinger coupling to reduce the compression forces in said joint means.

* * * * *